United States Patent
Loehr et al.

(10) Patent No.: US 11,212,843 B2
(45) Date of Patent: Dec. 28, 2021

(54) SKIPPING UPLINK TRANSMISSION ALLOCATED BY RACH PROCEDURE

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 144 days.

(21) Appl. No.: 16/533,554

(22) Filed: Aug. 6, 2019

(65) Prior Publication Data
US 2020/0053793 A1 Feb. 13, 2020

Related U.S. Application Data

(60) Provisional application No. 62/716,173, filed on Aug. 8, 2018.

(51) Int. Cl.
*H04W 74/08* (2009.01)
*H04W 76/11* (2018.01)
(Continued)

(52) U.S. Cl.
CPC ....... *H04W 74/0833* (2013.01); *H04L 1/1819* (2013.01); *H04L 5/0051* (2013.01);
(Continued)

(58) Field of Classification Search
None
See application file for complete search history.

(56) References Cited

U.S. PATENT DOCUMENTS

| 2017/0273056 A1* | 9/2017 | Papasakellariou .. H04W 52/143 |
| 2017/0289995 A1* | 10/2017 | Lin ................... H04W 72/0446 |
| 2019/0200381 A1* | 6/2019 | Wu ....................... H04W 80/02 |

OTHER PUBLICATIONS

PCT/IB2019-000879, "Notification of Transmittal of the International Search Report and the Written Opinion of the International Searching Authority, or the Declaration", PCT International Searching Authority, dated Jan. 8, 2020, pp. 1-13.

(Continued)

*Primary Examiner* — Christine T Duong
(74) *Attorney, Agent, or Firm* — Kunzler Bean & Adamson

(57) ABSTRACT

Apparatuses, methods, and systems are disclosed for skipping an uplink transmission allocated by a RACH procedure. One apparatus includes a transceiver of a remote unit that receives a random access response message ("RAR") comprising an RAR grant having an uplink resource allocation during a random access procedure ("RACH procedure"); a processor of the remote unit that determines an indication that skipping of a physical uplink shared channel ("PUSCH") transmission is configured for the RACH procedure and that no uplink data is available; and the processor controls the transceiver to skip the PUSCH transmission of a transmission block without logical channel ("LCH") data on the uplink resource allocation in response to the indication that skipping is configured for the RACH procedure and that no uplink data is available. A method or system may perform functions of the apparatus.

24 Claims, 9 Drawing Sheets

(51) Int. Cl.
*H04L 1/18* (2006.01)
*H04L 5/00* (2006.01)
*H04L 25/02* (2006.01)
*H04W 72/04* (2009.01)
*H04W 72/14* (2009.01)
*H04W 80/02* (2009.01)

(52) U.S. Cl.
CPC ........ *H04L 5/0055* (2013.01); *H04L 25/0226* (2013.01); *H04W 72/042* (2013.01); *H04W 72/14* (2013.01); *H04W 74/0808* (2013.01); *H04W 76/11* (2018.02); *H04W 80/02* (2013.01)

(56) References Cited

OTHER PUBLICATIONS

Ericsson, "Coexistence Between AUL and Dynamically Scheduled UL Grants (Tdoc R2-1805724)", 3GPP TSG-RAN WG2 #101-Bis, Apr. 16-20, 2018, pp. 1-5.

Nokia, "UL lost handling when UE configured to skip UL transmission (Release 14; R2-165149 update of R2-163695)", 3GPP TSG-RAN WG2 Meeting #95, Aug. 22-26, 2016, pp. 1-10.

Itri, "An invalid UL grant in RAR (R2-093911)", 3GPP TSG RAN WG2 #66bis, Jun. 29-Jul. 3, 2009, pp. 1-2.

Sequans, "Considerations on skipping UL padding transmissions (R2-162735)", 3GPP TSG-RAN WG2 #93bis, Apr. 11-15, 2016, pp. 1-7.

Lenovo, "LCP procedure for NR", R2-1711029, 3GPP TSG-RAN WG2 Meeting #99bis, Oct. 9-13, 2017, pp. 1-6.

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.2.0, Jul. 2018, pp. 1-126.

3GPP, "3rd Generation Partnership Project; Technical Specification Group Radio Access Network; NR; Multiplexing and channel coding (Release 15)", 3GPP TS 38.212 V15.2.0, Jun. 2018, pp. 1-98.

3GPP, "3rd Generation Partnership Project; Technical Specification Group Radio Access Network; NR; Physical channels and modulation (Release 15)", 3GPP TS 38.211 V15.2.0, Jun. 2018, pp. 1-96.

3GPP, "3rd Generation Partnership Project; Technical Specification Group Radio Access Network; NR; Physical layer procedures for control (Release 15)", 3GPP TS 38.213 V15.2.0, Jun. 2018, pp. 1-99.

* cited by examiner

500

| RAR grant field(s) 505 | # of Bits |
|---|---|
| Frequency Hopping Flag 510 | 1 |
| Msg3 PUSCH Frequency Resource Allocation 515 | 14 |
| Msg3 PUSCH Time Resource Allocation 520 | 4 |
| MCS 525 | 4 |
| TPC Command for Msg3 PUSCH 530 | 3 |
| CSI Request 535 | 1 |

Fig. 5

SKIPPING UPLINK TRANSMISSION ALLOCATED BY RACH PROCEDURE

CROSS-REFERENCE TO RELATED APPLICATIONS

This application claims priority to U.S. Patent Application Ser. No. 62/716,173 entitled "SKIPPING PUSCH TX ALLOCATED BY RACH" and filed on Aug. 8, 2018, for Joachim Loehr, which is incorporated herein by reference in its entirety.

FIELD

The subject matter disclosed herein relates generally to wireless communications and more particularly relates to selectively skipping an uplink (e.g., PUSCH) transmission allocated by a Random Access Procedure (also referred to as "RACH procedure").

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Access and Mobility Management Function ("AMF"), Positive-Acknowledgment ("ACK"), Access Stratum ("AS"), Autonomous Uplink ("AUL"), Base Station ("BS"), Binary Phase Shift Keying ("BPSK"), Bandwidth Part ("BWP"), Control Element ("CE"), Clear Channel Assessment ("CCA"), Cyclic Prefix ("CP"), Cyclical Redundancy Check ("CRC"), Cell Radio Network Temporary Identifier ("C-RNTI"), Channel State Information ("CSI"), Common Search Space ("CSS"), Connection Mode ("CM") (this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM") (this is a NAS state in EPS), Evolved UMTS Terrestrial Radio Access ("E-UTRA"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Globally Unique Temporary UE Identifier ("GUTI"), Hybrid Automatic Repeat Request ("HARQ"), Internet-of-Things ("IoT"), International Mobile Subscriber Identity ("MR"), Licensed Assisted Access ("LAA"), Load Based Equipment ("LBE"), Listen-Before-Talk ("LBT"), Logical Channel ("LCH"), Logical Channel Group ("LCG"), Long Term Evolution ("LTE"), Multiple Access ("MA"), Mobility Management Entity ("MME"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), New Generation Node B ("gNB"), New Generation Radio Access Network ("NG-RAN") (a RAN used for 5GS networks), New Radio ("NR"), New Radio Unlicensed spectrum ("NR-U"), Non-Access Stratum ("NAS"), Non-Orthogonal Multiple Access ("NOMA"), Operation and Maintenance System ("OAM"), Orthogonal Frequency Division Multiplexing ("OFDM"), Packet Data Unit ("PDU") (used in connection with 'PDU Session'), Packet Switched ("PS") (e.g., Packet Switched domain or Packet Switched service), Pilot Time Slot ("PTS"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Random Access ("RA"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RA", refers to NAS layer procedures and states), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Semi Persistent Scheduling ("SPS"), Service Data Unit ("SDU"), Shared Channel ("SCH"), Session Management Function ("SMF"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Technical Specification ("TS"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Vehicle RNTI ("V-RNTI"), and Worldwide Interoperability for Microwave Access ("WiMAX"). As used herein, "HARQ ACK" may represent collectively the Positive Acknowledge ("ACK") and the Negative Acknowledge ("NACK"). ACK means that a TB is correctly received while NACK (or NAK) means a TB is erroneously received.

A RACH procedure includes a preamble transmission ("PRACH," also referred to as "Msg1") by the UE, a Random Access Response ("RAR," also referred to as "Msg2"). The RAR includes a UL resource allocation. In contention-based RACH procedure (also referred to as "CBRA"), the UE responds to the RAR with a contention request (also referred to as "Msg3") using the UL resource allocation.

BRIEF SUMMARY

Apparatuses, methods, and systems are disclosed for selectively skipping an uplink transmission allocated by a RACH procedure. A method is disclosed that includes receiving a random access response message ("RAR") having an RAR with a grant for an uplink resource allocation during a random access procedure; determining an indication that skipping of an uplink (e.g., PUSCH) transmission is configured for the random access procedure and that no uplink data is available; and skipping a transmission of a transmission block without logical channel ("LCH") data on the uplink resource allocation in response to the indication that skipping is configured for the random access procedure and no uplink data is available, where the indication that skipping is configured for the random access procedure includes one or more of determining that the uplink grant was addressed to a Radio Network Temporary Identifier ("RNTI"), the RNTI selected from a Temporary Cell RNTI ("Temporary C-RNTI") and a Random Access RNTI ("RA-RNTI") and the uplink resources corresponding to the uplink grant being allocated on an unlicensed carrier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which:

FIG. 5 is a diagram illustrating one embodiment of a UL grant field in a RAR message;

DETAILED DESCRIPTION

Figure 1:
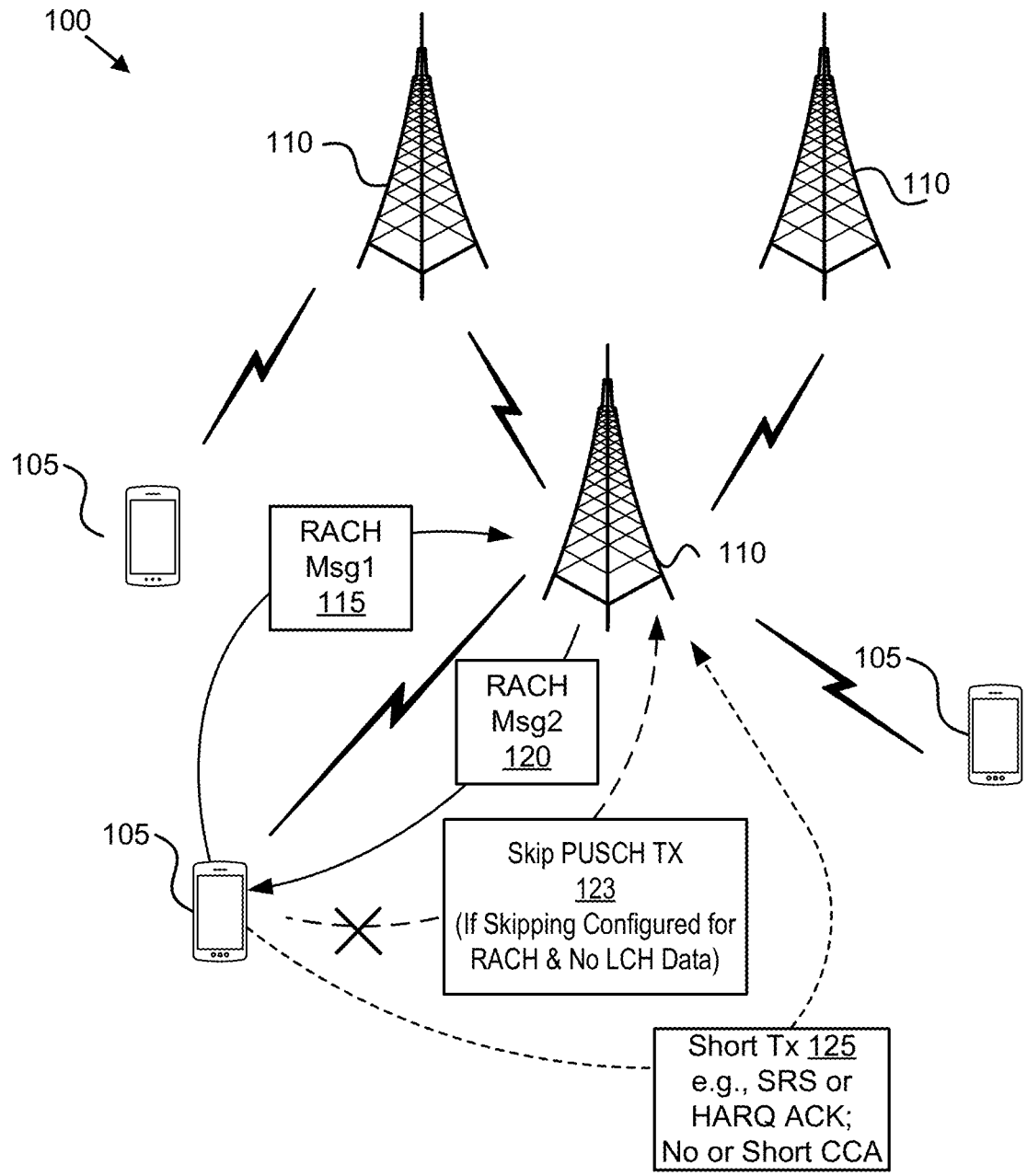
FIG. 1 is a schematic block diagram illustrating one embodiment of a wireless communication system for selectively skipping the PUSCH transmission allocated by a RAR.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM"), a Flash memory, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Generally, the present disclosure describes systems, methods, and apparatus that solve the problem of performing an "empty" uplink transmission in response to receiving a UL resource allocation within a Random Access Response message for the case that there is no data available for transmission in the UE. For example, even if a remote unit has no uplink data available, a base station may order the remote unit to do a RACH procedure to bring the remote unit into synchronization (e.g., based on the RACH preamble) so that it may receive available downlink data.

However, such uplink transmissions of transport blocks, also sometimes referred to herein as transmission blocks, without LCH data take time and power and thus may lead to an unnecessary transmission power consumption as well as additional interference which ultimately blocks the channel for others. This problem is especially disruptive for the case where uplink transmissions take place on an unlicensed carrier (e.g., NR-U) where blocking the channel can affect various applications using unlicensed spectrum. State-of-the-art forces a UE to follow an uplink allocation given in the Random Access Response message or RAR also referred to as RACH Msg2, even though there is no data available for transmission for any configured LCH. Consequently, the UE would generate a transport block ("TB") which may contain only padding or/and potentially a BSR MAC CE indicating a zero size buffer status which is of limited use for the scheduler in the network. Furthermore, UE would need to first undergo CCA ("Clear Channel Assessment") procedure for the transmission of this TB.

Because transmissions on the unlicensed medium, including transmission by the UE and the network, need to follow an LBT (Listen-Before-Talk) procedure for each of those messages individually and independently, any unneeded transmission also incurs the additional penalty of performing the corresponding LBT procedures. This applies to the Random Access procedure as well as to downlink (PDSCH) and uplink (PUSCH) transmission. Each of these transmissions must first undergo a CCA (clear channel assessment)

procedure before the transmission can be made on the unlicensed spectrum. This disclosure presents methods for avoiding the above-mentioned problems by allowing the UE to skip an uplink transmission scheduled by a Random Access Response message of a RACH procedure.

FIG. 1 depicts an embodiment of a wireless communication system 100 for selectively skipping the uplink transmission e.g., PUSCH transmission allocated by a RAR during a RACH procedure, according to various embodiments of the disclosure. In one embodiment, the wireless communication system 100 includes remote units 105 and base units 110. Even though a specific number of remote units 105 and base units 110 are depicted in FIG. 1, one of skill in the art will recognize that any number of remote units 105 and base units 110 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 105 include wearable devices, such as smart watches, fitness bands, optical head-mounted displays, or the like. Moreover, the remote units 105 may be referred to as subscriber units, mobiles, mobile units, mobile stations, users, terminals, mobile terminals, fixed terminals, subscriber stations, UE, user terminals, a device, or by other terminology used in the art.

The base units 110 may be distributed over a geographic region. In certain embodiments, a base unit 110 may also be referred to as an access point, an access terminal, a base, a base station, RAN node, Node-B, an eNB, a gNB, a Home Node-B, a relay node, a device, a core network, an aerial server, or by any other terminology used in the art. The base units 110 are generally part of a radio access network (RAN) that includes one or more controllers communicably coupled to one or more corresponding base units 110. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP NR protocol, wherein the base unit 110 transmits using an OFDM modulation scheme on the DL and the remote units 105 transmit on the UL using an SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 110 may serve a number of remote units 105 within a serving area, for example, a cell or a cell sector via a wireless communication link. The base units 110 transmit DL communication signals to serve the remote units 105 in the time, frequency, and/or spatial domain. The remote units 105 may communicate directly with one or more of the base units 110 via UL communication signals. In various embodiments, the DL and UL communication signals are sent over unlicensed spectrum.

In various embodiments, the remote unit 105 may synchronize to a cell of a base unit 110 and receive a system information block indicating various capabilities and parameters of the cell. The remote unit 105 later determines to initiate a RACH procedure and sends a RACH Msg1 115 (e.g., PRACH preamble) to the base unit 110. In response, the base unit 110 may send a RACH Msg2 120 (e.g., random access response or RAR messages) to the remote unit 105. As described in greater detail below, the remote unit 105 determines whether skipping uplink transmission is configured for the RACH procedure and skips uplink transmission, e.g., PUSCH transmission, on the resource allocation indicated in the RACH Msg2 if there is no data available for transmission for any configured LCH. If the uplink transmission is skipped, then in order for the base unit 110 to know that that remote unit 105 was correctly received Msg2, the remote unit 105 may respond to the RACH Msg2 with a short transmission 125, such as an SRS transmission or HARQ ACK transmission. In certain embodiments, the short transmission 125 may use a Type II CCA or no CCA. Embodiments in which a short transmission 125 may be an SRS transmission or a HARQ ACK transmission are referred to respectively as a third embodiment and a fourth embodiment and are described in more detail below with respect to FIGS. 6 and 7.

Figure 2:
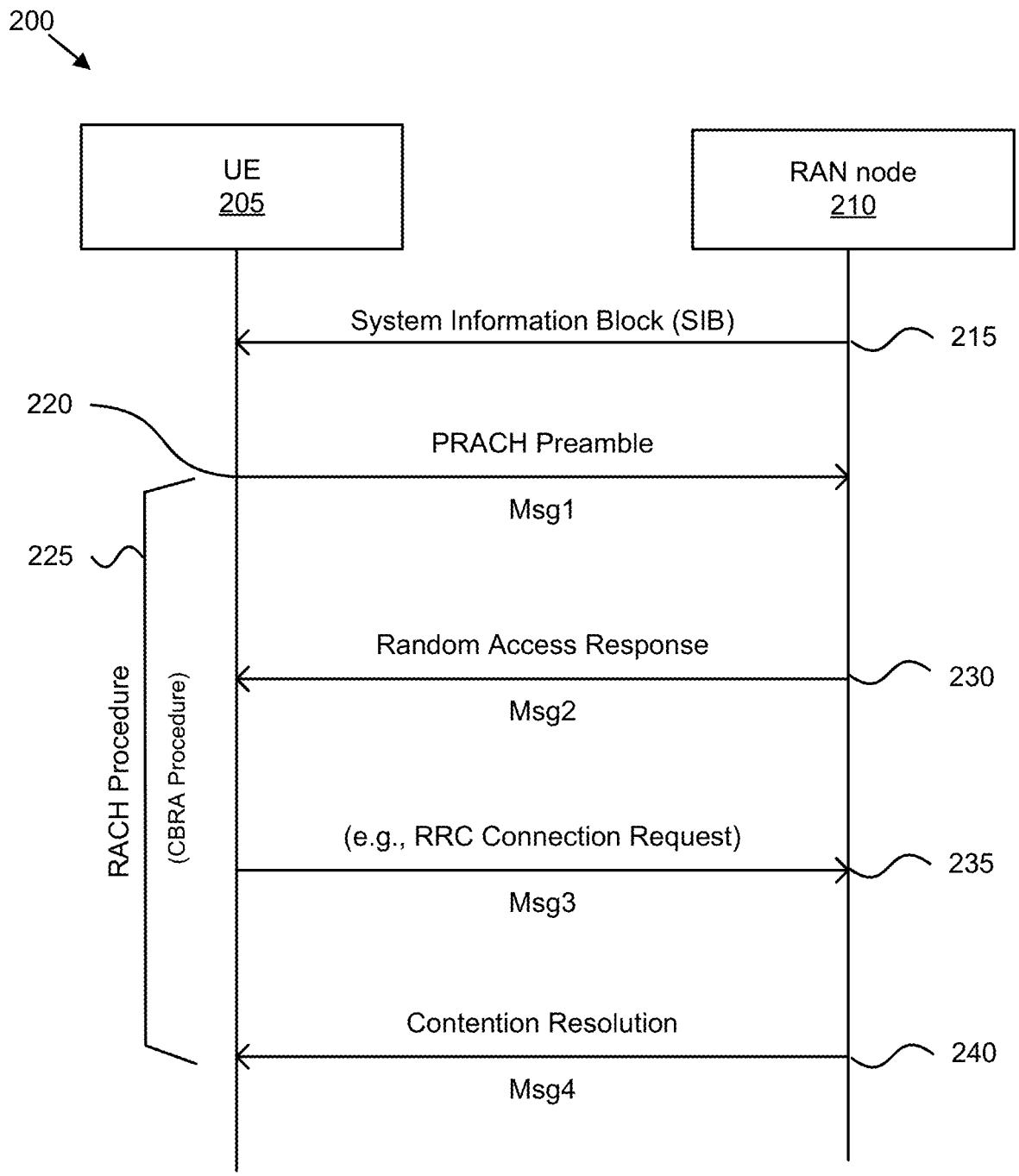
FIG. 2 is a diagram illustrating a first RACH procedure.

Also, note that the present disclosure uses terminology to describe various messages and procedures as outlined in 3GPP LTE and NR specifications available at the time of filing. Specifically, for the Random Access Procedure (sometimes called RACH Procedure). FIG. 2 shows frequently used LTE terminology for the four involved message exchanges. Note that in the NR context, the term "RAN node" or "gNB" is used instead of "eNB."

FIG. 2 depicts one embodiment 200 of a RACH procedure 225 between a UE 205 and a RAN node 210 also sometimes called a gNB, according to embodiments of the disclosure. The RAN node 210 broadcasts a system information block (SIB) 215, which the UE 205 receives. The UE 205 uses information in the SIB 215 to configure itself for the RACH procedure 225. In distinction from exiting systems in which skipping of uplink transmissions may be configured for circumstances other than in the RACH procedure, in various embodiments described herein, such as embodiment 200, the UE 205 determines whether skipping of an uplink transmission is configured for the RACH procedure 225 if no uplink data is available. More details about various ways in which the UE 205 may determine whether skipping of uplink transmission is allowed is provided below with respect to FIGS. 3-9.

As shown in FIG. 2, the UE 205 sends a PRACH preamble 220, referred to as Msg1 of the RACH procedure 225. The RAN node 210 receives the PRACH preamble 220 and sends a Random Access Response ("RAR") 230, referred to as Msg2 of the RACH procedure 225. The UE 205 listens for the RAR 230 over a Random Access Response window (ra-ResponseWindow), as described above. In the RACH procedure 225, if skipping is not configured for the RACH procedure 225 or if uplink data is available, the UE 205 sends an uplink transmission referred to as Msg3 235, of the RACH procedure. For example, the Msg3 235 may include an RRC Connection Request or MAC CEs or User data. The RAN node 210 sends a contention resolution message 240 to the UE, referred to as Msg4. Here, the Msg4 may include a UE contention resolution MAC CE for the UE 205.

It should be noted that FIG. 2 shows the so-called "contention-based random access" (CBRA). There exists also a contention-free Random Access Procedure ("CFRA") which is only comprised of the PRACH Preamble 220 transmission ("Msg1") and Random Access Response 230 ("Msg2"). In the CFRA, the UE 205 is allocated a RACH preamble and/or RACH resource, e.g. by means of a PDCCH order, which makes the need for a contention resolution obsolete. The Random Access Response (RAR) message 230 has the same content for the CBRA and the CFRA procedure. A CFRA is used, for example, for cases such as Handover, uplink Timing alignment as well as Beam failure recovery.

Although various embodiments described herein are described with reference to the CBRA procedure, certain embodiments are not limited to the CBRA. It should be further noted that the following embodiments are mainly described in the context of unlicensed transmission/cell, e.g., NR-U. However, various embodiments are also applicable to licensed cells, e.g., NR or LTE. Likewise, the principles of the solutions and embodiments may be applied to other 2-step RACH procedures, where the second message allocates UL resources to the UE.

Figure 3:
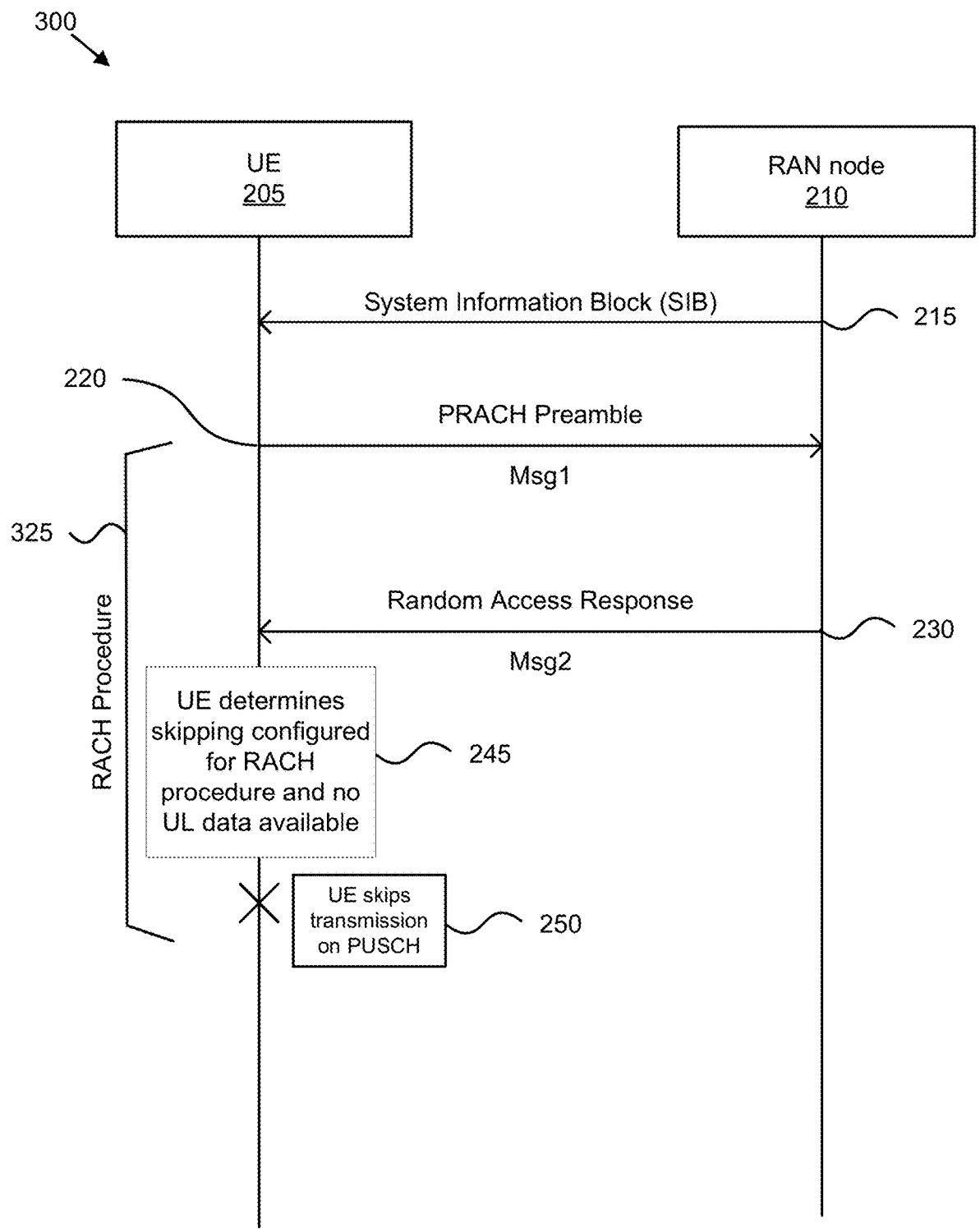
FIG. 3 is a diagram illustrating a second RACH procedure.

FIG. 3 depicts one embodiment 300 of a modified RACH procedure 325, according to embodiments of the disclosure. A key distinction is that the UE 205 selectively skips UL transmission of PUSCH resources indicated in Msg2 based on whether skipping UL transmission within the RACH procedure 325 is configured and whether there is available UL data, as described herein.

According to a first embodiment, the UE 205 (e.g., the remote unit 105) receives a random access response ("RAR") message 230 including an RAR with a grant for an uplink resource allocation during a random access procedure ("RACH procedure") 325. The UE 205 then determines an indication that skipping of an uplink transmission is configured for the RACH procedure 325 and that no uplink data is available, and skips the uplink transmission of a transmission block without logical channel ("LCH") data on the uplink resource allocation in response to the indication that skipping is configured for the RACH procedure 325 and no uplink data is available. In other words, the UE 205 skips the transmission of the uplink transmission on PUSCH, in response to the reception of an UL grant contained within the random access response message 230 (RACH Msg2) for cases in which there is an indication that skipping of uplink transmissions is configured for RACH procedures and that there is no data available for transmission for any of the configured logical channels.

Note that according to the current LTE/NR standard, for cases when there is no data available for transmission the UE 205 would generate an "empty" transport block which is comprised of only padding or padding and a so-called "padding" BSR (Buffer status report) MAC CE indicating a zero size buffer status. The information carried within such a transport block is basically of limited use for the scheduler in the base station (e.g., eNB, gNB, RAN node, etc.).

From a UE's perspective, the transmission of an "empty" TB, i.e., referring to the fact that only padding and potentially a BSR is contained in the TB, unnecessarily consumes transmission power. Further, the uplink transmission in response to the RAR may happen on an unlicensed medium, which implies a need to follow an LBT procedure, which further increases the required UE complexity unnecessarily. In addition, occupying the unlicensed carrier for only padding and/or padding BSR not only consumes transmission power from the mobile station, but also creates interference, and unnecessarily blocks the unlicensed channel for others.

Therefore, in various embodiments of a UE implemented according to the first embodiment, the UE 205 also skips generation of the transmission block without LCH data (i.e., a TB containing only padding and potentially a padding BSR MAC CE) because there is no need to generate a TB without LCH data since skipping of the uplink transmission is configured for the RACH procedure. In certain embodiments, indication that skipping is configured for the RACH procedure includes determining that the uplink grant was addressed to a Radio Network Temporary Identifier ("RNTI") selected from a Random Access RNTI ("RA-RNTI") (e.g., in the case of an initial uplink transmission granted by Msg2) and a Temporary Cell RNTI ("Temporary C-RNTI") (e.g., in the case of any retransmissions of the uplink transmission granted by Msg2).

In some embodiments, the UE 205 is configured to only skip PUSCH transmissions granted by Msg2 where the DCI is addressed to RA-RNTI but is not configured to skip retransmissions of the uplink transmission granted by Msg2, i.e., scheduled by DCI addressed to a Temporary C-RNTI. In one embodiment, the indication that skipping is configured for the RACH procedure includes the uplink resources corresponding to the uplink grant being allocated on an unlicensed carrier. For example, in some Releases, skipping uplink transmission of "empty" transmission blocks in cases of no uplink data being available is configured by being established in a specification for a particular Release, where the term "Release" may refer to a 3GPP implementation of features at a given point in time. In such a variant of the first embodiment, determining an indication that skipping an uplink transmission is configured for the RACH procedure 325 includes determining that the grant is allocated on an unlicensed carrier.

In some implementations of the first embodiment, the UE 205 is only allowed to skip uplink transmissions scheduled by RACH Msg2 230 if the UE 205 is configured for such skipping by higher layer signaling, e.g., where the indication that skipping of an uplink transmission for the RACH procedure UE is configured with a parameter such as the MAC parameter "skipUplinkTxDynamic".

In certain embodiments, the first embodiment may be realized for a RACH procedure in NR by specifying that the MAC entity is not to generate a MAC PDU for the HARQ entity if the following conditions are (all) satisfied: 1) the MAC entity is configured with skip UplinkTxDynamic and the grant indicated to the HARQ entity was addressed to a C-RNTI, Temporary C-RNTI or RA-RNTI, or the grant indicated to the HARQ entity is a configured uplink grant; and 2) there is no aperiodic CSI requested for this PUSCH transmission (e.g., as described in TS 38.212); and 3) the MAC PDU includes zero MAC SDUs; and 4) the MAC PDU includes only the periodic BSR and there is no data available for any LCG, or the MAC PDU includes only the padding BSR. For example, current 3GPP TS 38.321 (section 5.4.3) may be modified in accordance with the above to realize the first embodiment.

In certain implementations, the first embodiment may be realized for a RACH procedure in LTE/NR by extending beyond three cases in which uplink transmission may be skipped and adding an additional fourth case that configures skipping for RACH procedure if no uplink data is available. Some of the circumstances in which skipping is configured are where uplink transmission specifying that the MAC PDU includes only the MAC CE for padding BSR or periodic BSR with zero MAC SDUs and there is no aperiodic CSI requested for this transmission time interval ("TTI"), the MAC entity shall not generate a MAC PDU for the HARQ entity in the any of the following cases: 1) in the case where the MAC entity is configured with skipUplinkTxDynamic and the grant indicated to the HARQ entity was addressed to a C-RNTI; or 2) in the case where the MAC entity is configured with skipUplinkTxSPS and the grant indicated to the HARQ entity is a configured uplink grant activated by the MAC entity's Semi-Persistent Scheduling C-RNTI or by the MAC entity's UL Semi-Persistent Scheduling V-RNTI; or 3) in the case where the grant indicated to the HARQ entity is a configured uplink grant activated by the MAC entity's AUL C-RNTI. In various embodiments disclosed herein, a fourth case 4) is added to configure skipping of an uplink transmission for a RACH procedure in the case where the uplink grant indicated to the HARQ entity was addressed to an RA-RNTI or Temporary C-RNTI, and the corresponding UL resources are allocated on an unlicensed carrier (e.g., skipping uplink transmission during a RACH procedure when no uplink data is available is configured as part of the specification and the indication that skipping is enabled is determining that the UL resources are allocated on an unlicensed carrier). For example, current 3GPP TS 36.321 (section 5.4.3) may be modified in accordance with the above to realize the first embodiment.

In some implementations of the first embodiment, the indication that skipping is configured for the RACH procedure includes data within the RAR message. In other embodiments, the indication that skipping is configured for the RACH procedure comprises data within downlink control information ("DCI") scheduling the RAR message on a downlink shared channel ("DL-SCH"). Thus, in such embodiments, the RAR message (Msg2) or the DCI scheduling the RAR message on DL-SCH explicitly indicates whether the UE is allowed to skip the corresponding PUSCH transmission in case there is no data available for transmission, i.e., in case the TB would contain only padding and/or BSR MAC CE. In certain embodiments, the indication that skipping is configured for the RACH procedure comprises a higher layer signaling parameter that configures the remote unit for skipping the uplink transmission.

Moreover, according to a second embodiment, the Random Access Response message 230 sent from the network entity (e.g., RAN node 210) to the UE 205 in response to the reception of a RACH preamble indicates to the UE 205 to skip the subsequent uplink transmission. For cases when Random Access procedure 325 is ordered by the RAN node 210 (eNB, gNB, base station, and so forth) for the purpose of Uplink Timing alignment maintenance, e.g., DL data is received for a UE which is not uplink timing aligned, there may not be a need for the PUSCH transmission in response to the reception of the RAR because UE most likely has no uplink data available for transmission.

In such an embodiment, the indication that skipping is configured for the RACH procedure is received in the RAR message 230 and explicitly indicates to the remote unit (e.g., UE 205) to skip the uplink transmission and/or to not generate the transmission block without LCH data. Therefore, according to this second embodiment, in order to avoid the transmission of a Transport Block (TB) comprised of padding and potentially a BSR MAC CE, which might be further subject to LBT procedure, the RAN node 210 (e.g., RAN node 210) explicitly indicates to the UE 205 whether to perform the PUSCH transmission or not. Alternatively, the based station (e.g., RAN node 210) may explicitly indicate to the UE whether to generate a transport block or not.

As for the legacy RACH procedure (e.g. 225 as depicted in FIG. 2), upon transmission of the PRACH preamble 220, the UE 205 monitors during the RACH response window for the RACH response message, i.e., PDCCH addressed to RA-RNTI calculated from the timeslot/RACH resource in which preamble was sent. The RACH response message is a MAC PDU which consists of a MAC header and corresponding MAC Random Access Responses (MAC RAR). The MAC PDU header consists of one or more MAC PDU subheaders; each subheader corresponding to a MAC RAR (except for the Backoff Indicator subheader which is not considered here for simplicity). The MAC PDU subheader for a RAR 230 contains the Random Access Preamble Identifier field identifying the transmitted Random Access Preamble.

Figure 4:
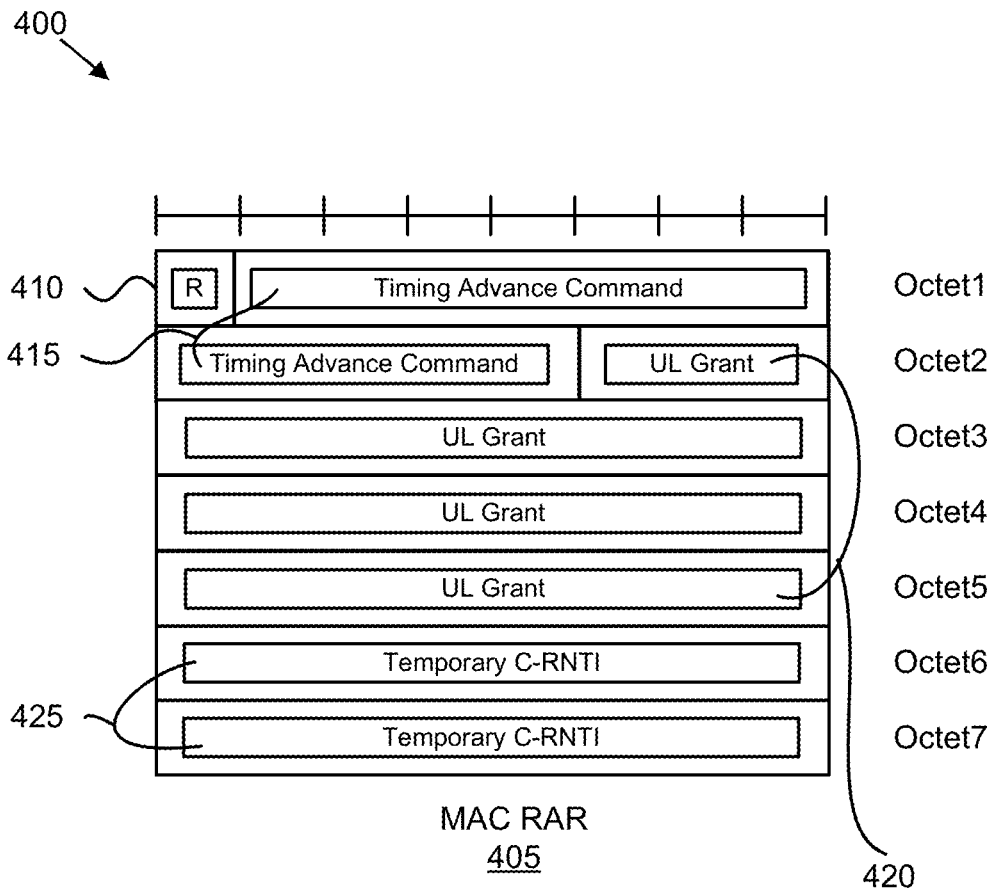
FIG. 4 is a diagram illustrating one embodiment of a RAR message.

FIG. 4 depicts one embodiment of 400 a MAC RAR 405, according to various embodiments of the disclosure. The MAC RAR 405 is of a fixed size and consists of the following fields: R: Reserved bit 410—in the MAC RAR 405, this field may be used to indicate whether the UE is to skip UL transmission according to the UL grant information; Timing Advance Command—the Timing Advance Command field 415 indicates the index value TA used to control the amount of timing adjustment that the MAC entity has to apply (e.g., as described in TS 38.213) and the size of the Timing Advance Command field 415 is 12 bits; UL Grant—the Uplink Grant field indicates the resources to be used on the uplink in (e.g., as described in TS 38.213), the size of the UL Grant field is 27 bits, the content of the UL grant field 420 signaled within the MAC RAR 405 is shown in FIG. 5, and in the MAC RAR 405, this field may be used to indicate whether the UE (e.g., 205) is to skip UL transmission according to the UL grant information; and Temporary C-RNTI—the Temporary C-RNTI field 425 indicates the temporary identity that is used by the MAC entity during Random Access and the size of the Temporary C-RNTI field is 16 bits.

According to the second embodiment, the RAR message (Msg2) (e.g., 230) may indicate to the UE (e.g., 205) not to perform an Uplink transmission according to the UL grant information transmitted in the RAR 230. In one implementation of this second embodiment, the Reserved "R" bit 410 in the MAC RAR 405 is used to indicate whether the UE shall perform a UL transmission according to the UL grant field 420. For example, in certain embodiments, if the R bit is set to '1' the UE shall follow the UL grant and perform a PUSCH accordingly, whereas the R bit being set to '0' orders the UE to ignore the UL grant field 420 and not to perform any PUSCH transmission, but still to process the other fields in MAC RAR 405 such as the Timing Advance Command field 415.

In various embodiments, the indication that skipping is configured for the RACH procedure includes a predefined combination of values within one or more fields of the MAC RAR 405 (e.g., the UL grant field 420).

According to a variant to the second embodiment, the UL grant field within the MAC RAR 400 may be used to indicate UL resources for short transmission such as a "one-shot" (e.g., having a single sensing slot) SRS transmission in case the Random Access response message indicates to the UE not to perform an uplink transmission on PUSCH. In one implementation, the fields of the UL grant field may be redefined to indicate uplink resources for an SRS transmission in case the reserved bit R is set to '0'. An SRS transmission could be used in order to acknowledge the successful reception of RACH Msg2, as described in further detail below with respect to various implementations described in this disclosure as a third embodiment.

In a further variant to the second embodiment, a predefined combination of values set for (e.g., a subset of) the fields of the UL grant information within the MAC RAR 400 may be used to indicate to the UE not to perform a PUSCH transmission. In one exemplary implementation, an invalid PUSCH frequency resource allocation or invalid PUSCH time resource allocation may indicate to the UE not to perform a corresponding PUSCH transmission.

FIG. 5 depicts one embodiment 500 of RAR grant fields 505 in a UL grant of a random access response message, such as the MAC RAR 405, according to embodiments of the disclosure. Note that the RAR grant fields 505 (e.g., fields in the UL grant) include a PUSCH frequency resource allocation field 515 and a PUSCH time resource allocation field 520. In one embodiment, the predefined combination of values includes an invalid value in a resource allocation of the RAR grant fields. For example, in various embodiments, the resource allocation of the RAR grant fields 505 (in which an invalid value is the indication that skipping is configured for the RACH procedure) is selected from the Msg3 physical uplink shared channel ("PUSCH") frequency allocation 515 and the PUSCH time resource allocation 520. In other words, in such embodiments, if either the PUSCH frequency allocation or the PUSCH time resource allocation is invalid, the UE may skip the uplink transmission. As described above, the base station (e.g., base unit 110) may indicate to the UE (e.g., remote unit 105) not to perform a PUSCH transmission by setting the value(s) of the PUSCH frequency resource allocation field and/or PUSCH time resource allocation field to an invalid allocation.

Figure 6:
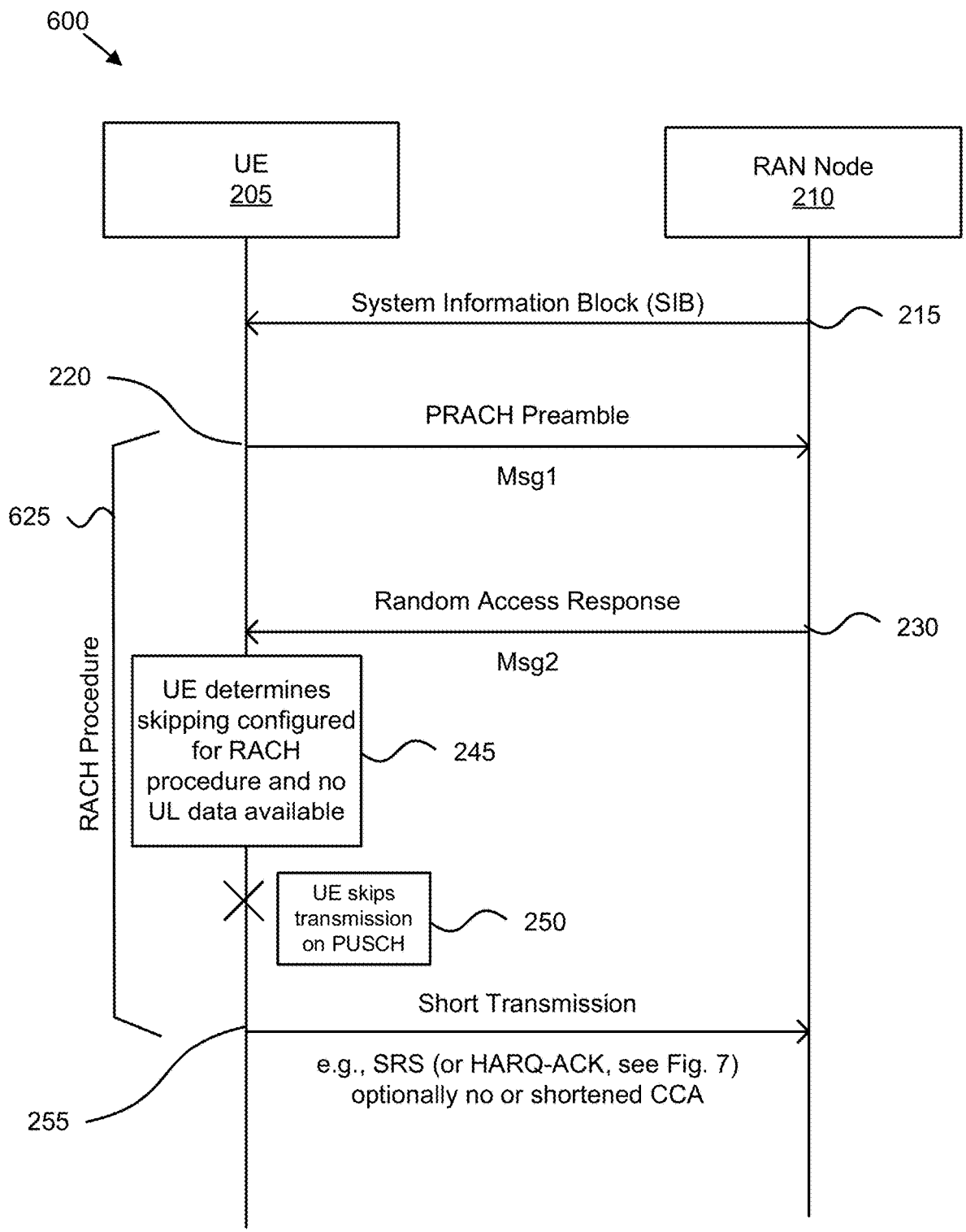
FIG. 6 is a diagram illustrating a third RACH procedure.

FIG. 6 depicts one embodiment 600 of a modified RACH procedure 625 between the UE 205 and the RAN node 210, according to various embodiments of the disclosure. A distinction from the traditional RACH procedure 225 is that, in the modified RACH procedure 625, the UE 205 selectively skips 250 UL transmission on PUSCH resources allocated in the Msg2 230 if skipping uplink transmission is configured for the RACH procedure 625 and no UL data is available. Rather, the UE may send a short transmission 255 such as an SRS transmission to acknowledge the Msg2 230. In the current NR or LTE standard, the reception of the PUSCH transmission scheduled by RAR 230 may be interpreted by the RAN node 210 as an acknowledgment for RACH Msg2 230. In the modified RACH procedure 625, however, the PUSCH transmission scheduled by RAR is skipped when no UL data is available, thus the short transmission 255, (e.g., SRS transmission) indicates an acknowledgment for RACH Msg2 230.

According to a third embodiment, the UE (e.g., remote unit 105) transmits an aperiodic sounding reference signal ("SRS") to indicate acknowledgment of the RAR during the RACH procedure in which skipping is configured and no uplink data is available. Sending the SRS in response to the reception of Msg2 230, which is not protected by HARQ, has the advantage that the base station (e.g., RAN node 210, for example, implemented as a gNB) is aware of the successful reception of Msg2 230. This further allows the UE skipping the PUSCH transmission (according to the UL grant in RAR 230) for cases when there is no data available for any configured LCH.

According to a variant of the third embodiment, the base station, e.g., RAN node 210, may request the transmission of an (aperiodic) SRS transmission in response to the reception of RACH Msg2 230. In certain embodiments, the UL grant field within the RAR 230 may include the request for an aperiodic SRS transmission. In one embodiment, the resources for the SRS transmission may be predefined, e.g.

by higher layer signaling. In another embodiment, the UE may transmit the SRS on the Uplink resource allocated for the PUSCH transmission, e.g., in the last OFDM symbol of the PUSCH allocation. Alternatively, in other embodiments, the UL resources for the SRS transmission may be allocated separately within the RAR message 230. In various embodiments, the base station (e.g., RAN node 210) is ready to receive both PUSCH and SRS transmission from the UE 205. Note that the UE 205 skips PUSCH transmission 245 if skipping is configured for the RACH procedure 625 and there is no data available for any configured LCH.

According to a further variant of the third embodiment, the base station (e.g., RAN node 210) may allocate resources for a PUSCH transmission as well as resources for an aperiodic SRS 255 transmission within the RAR 230. In certain embodiments, for the situation where there is data available for transmission for a configured LCH, or for the situation where there is a MAC CE other than a BSR MAC CE indicating zero-size buffer status has been triggered for transmission, the UE 205 generates a transport block and transmits it on the allocated PUSCH resources, without transmitting the SRS 255 on the allocated resources. Otherwise (e.g., for the situation where there is no data available for any configured LCH) the UE 205 generates no transport block for PUSCH transmission but instead transmits the SRS 255 on the allocated resources. For cases when a MAC PDU would only include the MAC CE for padding BSR or periodic BSR with zero MAC SDUs, the UE 205 generates no transport block and does not transmit it on the allocated PUSCH resources, but instead only transmits the SRS 255 on the allocated resources.

In various embodiments, if the short transmission 255 is initiated by the UE 205, a Type I CCA may be required to ensure that the channel is clear transmitting the short transmission 255 (e.g. SRS or HARQ-ACK). In certain embodiments, a shortened clear channel assessment ("Type II CCA") may be performed for the short transmission 255 (e.g., SRS transmission or HARQ-ACK transmission). For example, if the RAN node 210 obtained channel access using Type I, it may share the channel occupancy with the UE 205. In such embodiments, the RAN node 210 may explicitly indicate to the UE 205 that it may use Type II channel access. This explicit indication could be part of a dynamic PDCCH such as a UL grant, or in this context an SRS trigger, or in a groupcast/broadcast DCI where the RAN node 210 indicates that it obtained the channel and shares the channel occupancy with UE(s) 105 so that a Type II CCA may be performed for the short transmission 255 e.g., SRS transmission or HARQ ACK transmission. Thus, in certain embodiments, the UE 205 is configured to use channel access Type II, implying a fixed (shorter) sensing interval for the Clear Channel Assessment procedure, for transmission of SRS 255. In other embodiments, the UE 205 is configured to transmit without a Clear Channel Assessment procedure for transmission of the short transmission 255 (e.g., SRS or HARQ-ACK) as a response to Msg2.

Figure 7:
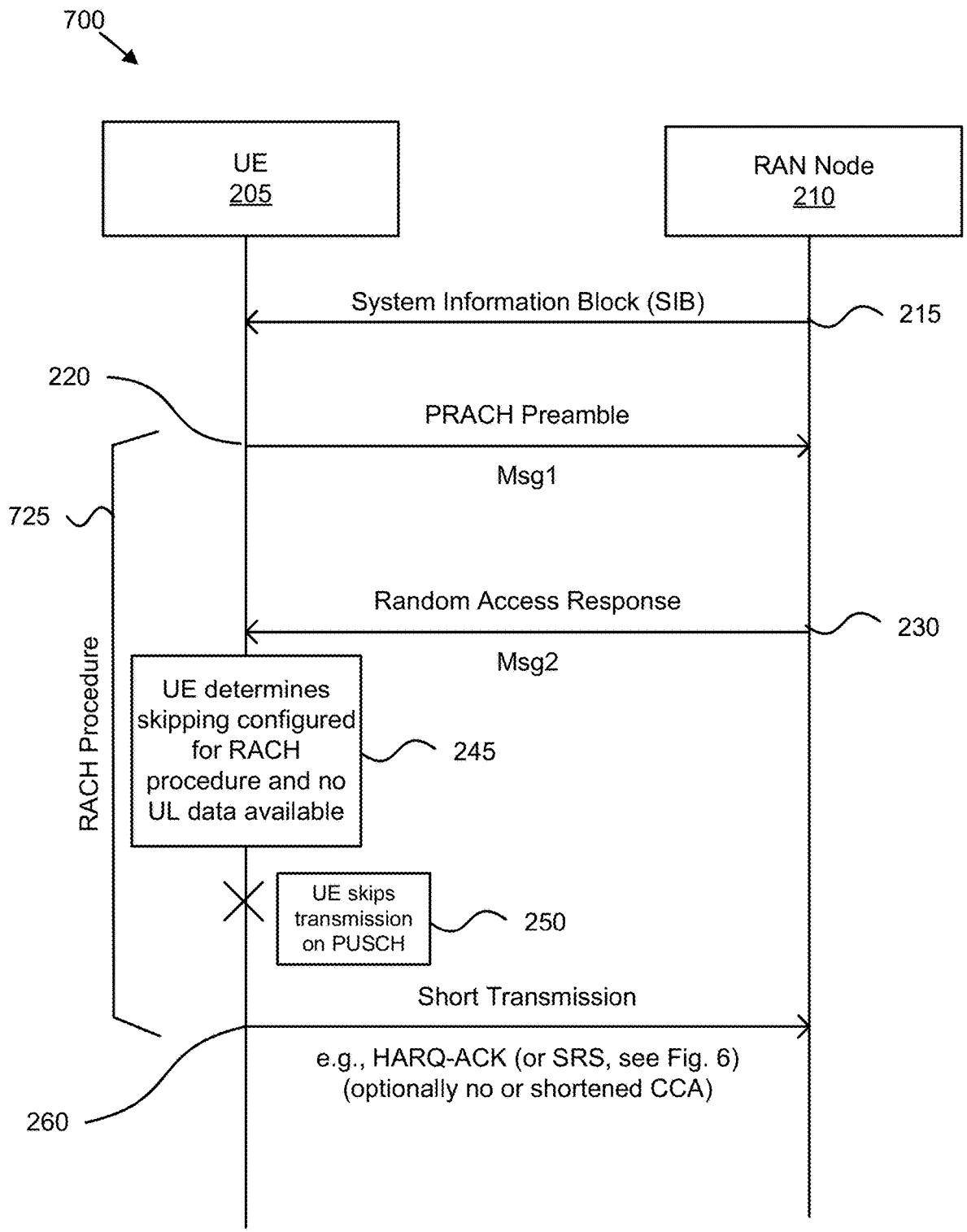
FIG. 7 is a diagram illustrating a fourth RACH procedure.

FIG. 7 depicts one embodiment 700 of a modified RACH procedure 725 between the UE and the RAN node 210 (e.g., gNB), according to embodiments of the disclosure. A distinction from the traditional RACH procedure 225 is that, in the modified RACH procedure 725, the UE 205 selectively skips UL transmission on PUSCH resources allocated in the Msg2 230 if no UL data is available. Rather, the UE 205 may send a short transmission such as the HARQ ACK 260 transmission to acknowledge the Msg2 230. In the current NR or LTE standard, the reception of the PUSCH transmission scheduled by RAR 230 may be interpreted by the RAN node 210 as an acknowledgment for RACH Msg2 230. In the modified RACH procedure 725, however, the PUSCH transmission scheduled by RAR 230 is skipped when no UL data is available, thus the HARQ ACK 260 transmission is an acknowledgment for RACH Msg2 230.

According to a fourth embodiment, the UE transmits a HARQ ACK 260 in response to the reception of a Random Access Response (RACH Msg2) 230. Sending the HARQ ACK 260 in response to the reception of Msg2, which is not protected by HARQ, has the advantage that the base station is aware of the successful reception of Msg2 230. This further allows the UE skipping the PUSCH transmission (according to the UL grant in RAR 230) for cases when there is no data available for any configured LCH. The HARQ ACK 260 sent in response to the reception of Msg2 230 is beneficially transmitted on a PUCCH resource. The PUCCH resource for the HARQ ACK 260 may be linked to the CCE index of the DCI scheduling the RAR 230 Msg2 on DL-SCH.

According to a further variant of the embodiment, the base station may allocate resources for a PUSCH transmission within the RAR 230. In case there is data available for transmission for a configured LCH or a MAC CE other than a BSR MAC CE indicating zero-size buffer status has been triggered for transmission, the UE generates a transport block and transmits it on the allocated PUSCH resources. It may not transmit the HARQ ACK 260 on the allocated resources though.

For cases when a MAC PDU would only include the MAC CE for padding BSR or periodic BSR with zero MAC SDUs, the UE 205 would according to this variant only perform the HARQ ACK 260 transmission.

As explained above, according to a further embodiment, the UE 205 is configured to use channel access Type II, implying a fixed (shorter) sensing interval for the Clear Channel Assessment procedure, for transmission of a HARQ ACK 260. This is particularly advantageous if the PUCCH sending the HARQ ACK 260 response to Msg2 has a short time duration, such as provided by PUCCH formats 0 and 2, for example as defined by 3GPP TS 38.211.

According to a further embodiment, the UE 205 is configured to transmit without a Clear Channel Assessment procedure for transmission of a HARQ ACK 260. This is particularly advantageous if the PUCCH sending the HARQ ACK 260 response to Msg2 230 has a short time duration, such as provided by PUCCH formats 0 and 2, as defined by 3GPP TS 38.211, where advantageously the duration is one OFDM symbol or less.

Figure 8:
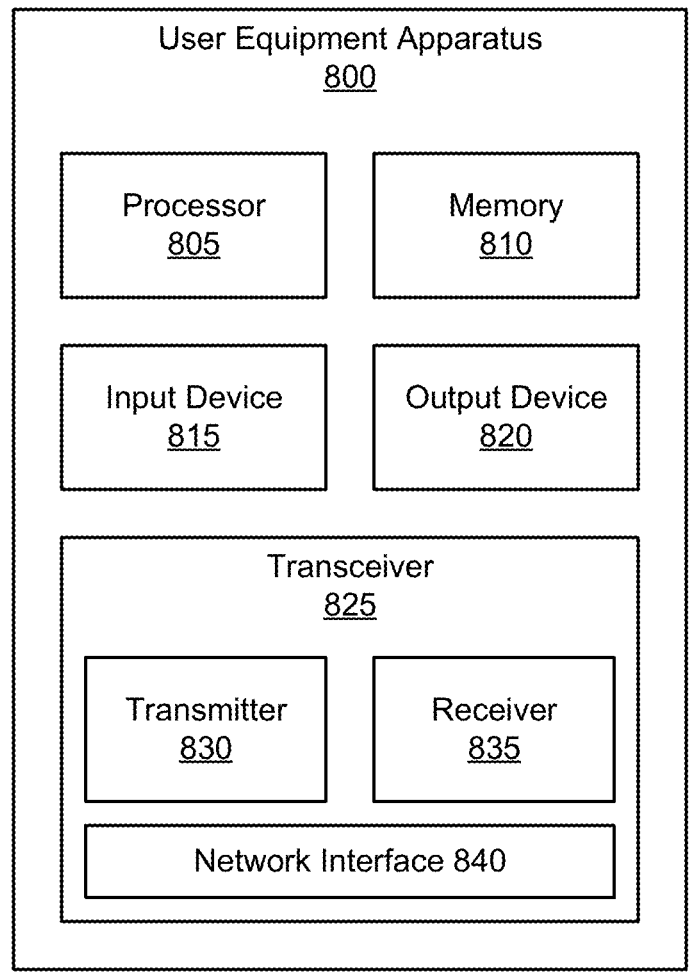
FIG. 8 is a schematic block diagram illustrating one embodiment of a remote unit apparatus that may be used for selectively skipping the PUSCH transmission allocated by a RAR.

FIG. 8 depicts one embodiment of a user equipment apparatus 800 that may be used for selectively skipping the PUSCH transmission allocated by a RAR, according to embodiments of the disclosure. The user equipment apparatus 800 may be one embodiment of the remote unit 105 or UE, described above. Furthermore, the user equipment apparatus 800 may include a processor 805, a memory 810, an input device 815, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of the processor 805, the memory 810, and the transceiver 825, and the input device 815 and/or the output device 820 may be not included.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field-programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 receives (e.g., via the transceiver 825) a random access response message with an RAR grant having an uplink resource allocation from a base unit during a random access procedure, i.e., RACH procedure. Here, the random access response message grants an uplink resource allocation (e.g., PUSCH resources). The processor 805 determines an indication that skipping of an uplink transmission is configured for the RACH procedure and that no uplink data is available. In such embodiments, the processor 805 controls the transceiver 825 to skip the uplink transmission and/or the generation of a transmission block without logical channel ("LCH") data on the uplink resource allocation in response to the indication that skipping is configured for the RACH procedure and no uplink data is available.

In certain embodiments, the indication that skipping is configured for the RACH procedure includes determining that the uplink grant was addressed to a Radio Network Temporary Identifier ("RNTI"), the RNTI selected from a Temporary Cell RNTI ("Temporary C-RNTI") and a Random Access RNTI ("RA-RNTI"). In the RACH procedure, the RA-RNTI is used to schedule random access transmissions and the Temporary C-RNTI is used to schedule retransmissions. In some embodiments, the indication that skipping is configured for the RACH procedure includes the uplink resources corresponding to the uplink grant being allocated on an unlicensed carrier. In various embodiments, the indication that skipping is configured for the RACH procedure comprises data within the RAR message. In various embodiments, the indication that skipping is configured for the RACH procedure includes the uplink resources corresponding to the uplink grant being allocated on an unlicensed carrier.

In some embodiments, the processor 805 further receives a retransmission request corresponding to the random access response message. In one embodiment, the processor 805 controls the transceiver 825 to skip the retransmission, e.g., in response to the retransmission request being scheduled by DCI addressed to a Temporary Cell RNTI of the remote unit. In another embodiment, the processor 805 controls the transceiver 825 to transmit a TB in response to the retransmission request being scheduled by DCI addressed to a Temporary Cell RNTI of the remote unit. For example, in various embodiments, the TB may contain only padding or may include a BSR MAC CE indicating a zero size buffer status and padding.

In some embodiments, the processor 805 further controls the transceiver 825 to transmit an aperiodic sounding reference signal ("SRS") to indicate acknowledgment of the RAR during the RACH procedure in which skipping is configured and no uplink data is available. In certain embodiments, a request to transmit the SRS is conveyed in an uplink grant field of the RAR message. In various embodiments, the SRS is transmitted on the uplink resource allocation for the uplink transmission. In some embodiments, a resource allocation for the SRS transmission is configured using a higher layer signaling parameter. In other embodiments, a resource allocation for the SRS transmission comprises a parameter in the RAR message separate from the uplink resource allocation in the RAR grant. In various embodiments, the SRS is transmitted on the uplink resource allocation for the uplink transmission. In certain embodiments, the processor 805 further controls the transceiver 825 to transmit PUSCH and to not transmit the SRS in response to determining that uplink data is available.

In some embodiments, the processor 805 further controls the transceiver 825 to transmit a HARQ ACK message to indicate acknowledgment of the RAR during the RACH procedure in which skipping is configured and no uplink data is available. In certain embodiments, the transceiver 825 transmits the HARQ ACK on a PUCCH resource. In various embodiments, the PUCCH resource is linked to a CCE index of downlink control information DCI scheduling the RAR message on a downlink DL-SCH. In some embodiments, the processor 805 further controls the transceiver 825 to transmit PUSCH and to not transmit the HARQ ACK in response to determining that uplink data is available.

Similarly to the procedure described above with respect to transmitting a short transmission such as an SRS to indicate acknowledgement of the RAR while also sending a shortened clear channel assessment, in certain embodiments, the processor 805 further controls the transceiver 825 to perform a shortened clear channel assessment ("Type II CCA") for the transmission of the HARQ ACK. In an alternative implementation, the processor 805 further controls the transceiver to transmit the HARQ ACK without performing a clear channel assessment ("CCA"). The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to modifying a radio capability. For example, the memory 810 may store UE radio capabilities, CM states, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, such as for example, a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a liquid crystal display ("LCD"), a light-emitting diode ("LED") display, an organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a tablet computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

In various embodiments, the transceiver 825 includes at least one transmitter 830 and at least one receiver 835. One or more transmitters 830 may be used to provide UL communication signals to a base unit 110, such as the AUL transmissions described herein. Similarly, one or more receivers 835 may be used to receive DL communication signals from the base unit 110, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an application-specific integrated circuit ("ASIC"), or another type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
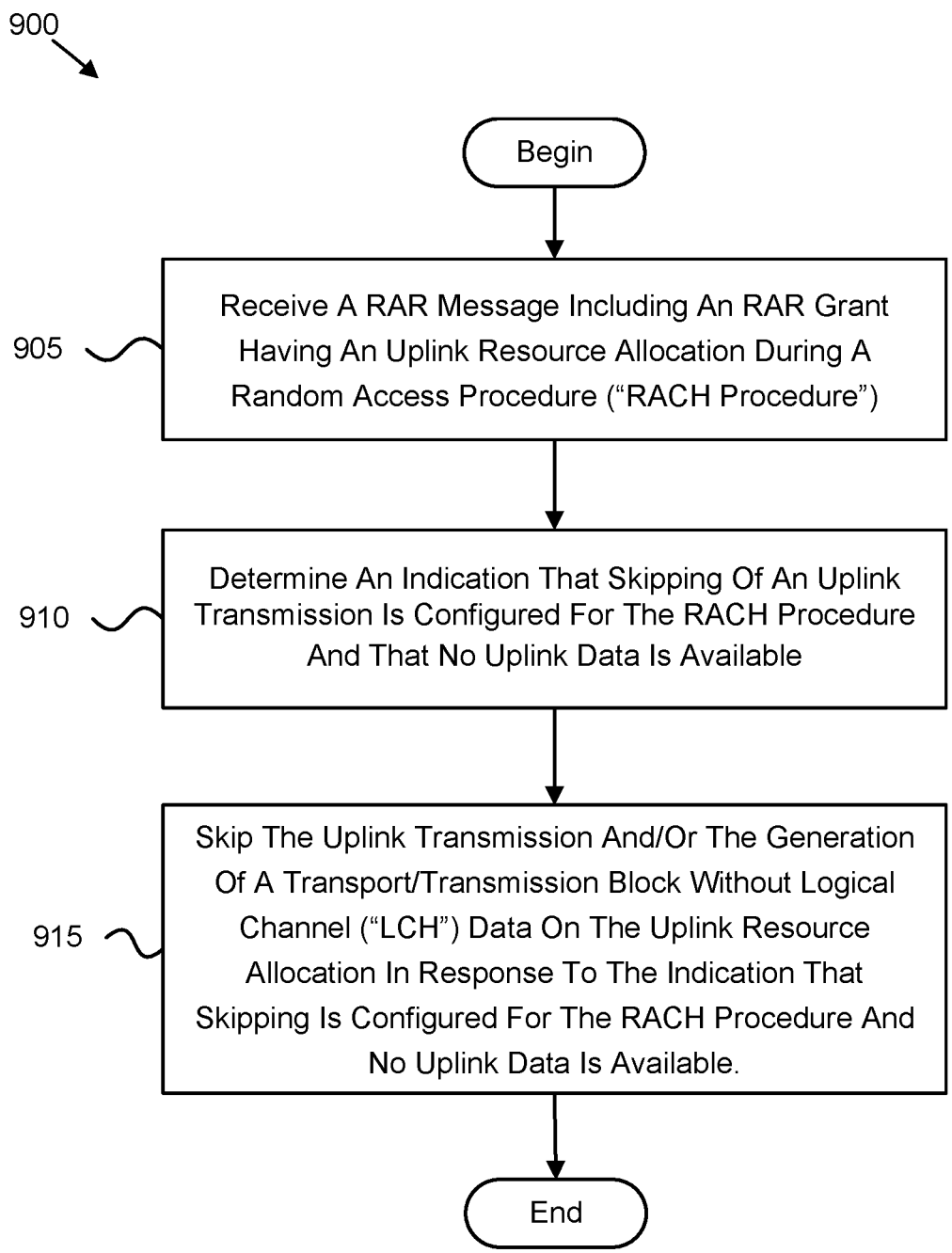
FIG. 9 is a schematic flow chart diagram illustrating one embodiment of a method for selectively skipping the PUSCH transmission allocated by a RAR.

FIG. 9 is a schematic flow chart diagram illustrating one embodiment of a method 900 for selectively skipping the PUSCH transmission allocated by a RAR. In one embodiment the method 900 begins and receives 905 a random access response ("RAR") message comprising an RAR grant having an uplink resource allocation during a random access procedure ("RACH procedure"). In various embodiments, the method 900 continues and determines 910 an indication that skipping of an uplink transmission is configured for the RACH procedure and that no uplink data is available. The method 900 continues and skips the uplink transmission and/or the generation of a transmission block without logical channel ("LCH") data on the uplink resource allocation in response to the indication that skipping is configured for the RACH procedure and no uplink data is available. In various embodiments, the user equipment apparatus 800 and/or the UE 205 perform one or more of the steps of the method 900.

An apparatus includes, in one embodiment, a transceiver of a remote unit that receives a random access response ("RAR") message having an RAR grant with an uplink resource allocation during a random access procedure ("RACH procedure"); a processor of the remote unit that determines an indication that skipping of an uplink transmission is configured for the RACH procedure and that no uplink data is available; and the processor controls the transceiver to skip the uplink transmission of a transmission block without logical channel ("LCH") data on the uplink resource allocation in response to the indication that skipping is configured for the RACH procedure and no uplink data is available.

In various embodiments, the processor further controls the transceiver to skip generation of the transmission block without LCH data. In certain embodiments, the indication that skipping is configured for the RACH procedure comprises determining that the uplink grant was addressed to a Radio Network Temporary Identifier ("RNTI"), the RNTI selected from a Temporary Cell RNTI ("Temporary C-RNTI") and a Random Access RNTI ("RA-RNTI"). In some embodiments, the indication comprises the uplink resources corresponding to the uplink grant being allocated on an unlicensed carrier.

In certain embodiments, the indication that skipping is configured comprises a predefined combination of values within one or more fields of the RAR grant. In some embodiments, the predefined combination of values comprises an invalid value in a resource allocation of the RAR grant. In one embodiment, the resource allocation of the RAR grant is selected from a Msg3 physical uplink shared channel ("PUSCH") frequency allocation and a PUSCH time resource allocation.

In some embodiments, the indication that skipping is configured comprises data within downlink control information ("DCI") scheduling the RAR message on a downlink shared channel ("DL-SCH"). In various embodiments, the indication comprises a higher layer signaling parameter that configures the remote unit for skipping the uplink transmission. In certain embodiment, the processor further receives a retransmission request corresponding to the RAR message; and the processor controls the transceiver to skip the retransmission. In some embodiments, the retransmission request is scheduled by DCI addressed to a Temporary C-RNTI. In certain embodiments, the processor further receives a retransmission request corresponding to the RAR message; and the processor controls the transceiver to transmit a transmission block in response to the retransmission request being scheduled by DCI addressed to a Temporary Cell RNTI of the remote unit.

In some embodiments, the indication that skipping is configured is received in the RAR message and further explicitly indicates to the remote unit to skip the uplink transmission and/or to not generate the transmission block without LCH data. In certain embodiments, the RACH procedure is started in response to a RACH order for aligning uplink timing. In one embodiment, the indication that explicitly indicates to the remote unit to skip the uplink transmission and/or to not generate the transmission block without LCH data is received in a Reserved ("R") bit of the RAR message. In various embodiments, in response to the R bit being not set, the processor controls the transceiver to skip the transmission on the uplink resource of the grant and processes one or more other commands in fields of the RAR message other than a grant field.

In certain embodiments, the one or more other commands comprises a timing advance command. In one embodiment, the processor further controls the transceiver to transmit an aperiodic sounding reference signal ("SRS") to indicate acknowledgment of the RAR during the RACH procedure in which skipping is configured and no uplink data is available. In some embodiments, the aperiodic SRS indicates acknowledgement of the RAR message. In various embodiments, a request to transmit the SRS is conveyed in an uplink grant field of the RAR message.

In various embodiments, a resource allocation for the SRS transmission is configured using a higher layer signaling parameter. In some embodiments, the SRS is transmitted on the uplink resource allocation for the uplink transmission. In some embodiments, the SRS is transmitted in the last orthogonal frequency division multiplexing ("OFDM") symbol of the uplink resource allocation. In certain embodiments, a resource allocation for the SRS transmission comprises a parameter in the RAR message separate from the uplink resource allocation in the RAR grant. In one embodiment, the processor further controls the transceiver to transmit PUSCH and to not transmit the SRS in response to determining that uplink data is available.

In some embodiments, the processor skips generation of the transmission block without LCH data according to the RAR message received during the RACH procedure in which skipping is configured and no uplink data is available. In various embodiments, the processor further controls the transceiver to transmit a hybrid automatic repeat request ("HARQ") acknowledgment ("ACK") message to indicate acknowledgment of the RAR during the RACH procedure in which skipping is configured and no uplink data is available. In certain embodiments, the transceiver transmits the HARQ ACK on a Physical Uplink Control Channel ("PUCCH") resource. In one embodiment, the PUCCH resource is linked to a control channel element ("CCE") index of downlink control information ("DCI") scheduling the RAR message on a downlink shared channel ("DL-SCH").

In certain embodiments, the processor further controls the transceiver to transmit PUSCH and to not transmit the HARQ ACK in response to determining that uplink data is available. In various embodiments, the processor further controls the transceiver to perform a shortened clear channel assessment ("Type II CCA") for the transmission of the HARQ ACK. In some embodiments, the processor further controls the transceiver to transmit the HARQ ACK without performing a clear channel assessment ("CCA").

A method for a remote unit includes, in one embodiment, receiving a random access response ("RAR") message having an RAR grant with an uplink resource allocation during a random access procedure ("RACH procedure"); determining an indication that skipping of an uplink transmission is configured for the RACH procedure and that no uplink data is available; and skipping the uplink transmission of a transmission block without logical channel ("LCH") data on the uplink resource allocation in response to the indication that skipping is configured for the RACH procedure and no uplink data is available.

In one embodiment, the method includes skipping generation of the transmission block without LCH data. In certain embodiments, the indication that skipping is configured for the RACH procedure comprises determining that the uplink grant was addressed to a Radio Network Temporary Identifier ("RNTI"), the RNTI selected from a Temporary Cell RNTI ("Temporary C-RNTI") and a Random Access RNTI ("RA-RNTI"). In various embodiments, the method includes the uplink resources corresponding to the uplink grant being allocated on an unlicensed carrier. In some embodiments, the indication that skipping is configured comprises a predefined combination of values within one or more fields of the RAR grant. In certain embodiments, the predefined combination of values includes an invalid value in a resource allocation of the RAR grant.

In one embodiment, the resource allocation of the RAR grant is selected from a Msg3 physical uplink shared channel ("PUSCH") frequency allocation and a PUSCH time resource allocation. In various embodiments, the indication that skipping is configured comprises data within downlink control information ("DCI") scheduling the RAR message on a downlink shared channel ("DL-SCH"). In some embodiments, the indication comprises a higher layer signaling parameter that configures the remote unit for skipping the uplink transmission. In certain embodiments, the method includes receiving a retransmission request corresponding to the RAR message and skipping the retransmission. In various embodiments, the retransmission request is scheduled by DCI addressed to a Temporary C-RNTI.

In certain embodiments, the method further includes receiving a retransmission request corresponding to the RAR message and performing the retransmission in response to the retransmission request being scheduled by DCI addressed to a Temporary Cell RNTI of the remote unit. In some embodiments, the indication that skipping is configured is received in the RAR message and further explicitly indicates to the remote unit to skip the uplink transmission and/or to not generate the transmission block without LCH data. In one embodiment, the RACH procedure is started in response to a RACH order for aligning uplink timing. In various embodiments, the indication that explicitly indicates to the remote unit to skip the uplink transmission and/or to not generate the transmission block without LCH data is received in a Reserved ("R") bit of the RAR message. In certain embodiments, in response to the R bit being not set, the remote unit skips the transmission on the uplink resource of the grant and processes one or more other commands in fields of the RAR message other than a grant field.

In various embodiments, the one or more other commands comprises a timing advance command. In certain embodiments, the method further includes transmitting an aperiodic sounding reference signal ("SRS") to indicate acknowledgment of the RAR message during the RACH procedure in which skipping is configured and no uplink data is available. In one embodiment, the aperiodic SRS indicates acknowledgment of the RAR message. In certain embodiments, a request to transmit the SRS is conveyed in an uplink grant field of the RAR message.

In some embodiments, a resource allocation for the SRS transmission is configured using a higher layer signaling parameter. In various embodiments, the SRS is transmitted on the uplink resource allocation for the uplink transmission. In certain embodiments, a resource allocation for the SRS transmission comprises a parameter in the RAR message separate from the uplink resource allocation in the RAR grant. In one embodiment, the method further includes transmitting PUSCH and not transmitting the SRS in response to determining that uplink data is available. In certain embodiments, the method further includes skipping generation of the transmission block without LCH data according to the RAR message received during the RACH procedure in which skipping is configured and no uplink data is available.

In one embodiment, the method further includes transmitting a hybrid automatic repeat request ("HARQ") acknowledgment ("ACK") message to indicate acknowledgment of the RAR during the RACH procedure in which skipping is configured and no uplink data is available. In one embodiment, the HARQ ACK is transmitted on a Physical Uplink Control Channel ("PUCCH") resource. In various embodiments, the PUCCH resource is linked to a control channel element ("CCE") index of downlink control information ("DCI") scheduling the RAR message on a downlink shared channel ("DL-SCH"). In certain embodiments, the method further includes transmitting PUSCH and not transmitting the HARQ ACK in response to determining that uplink data is available. In some embodiments, the remote unit performs a shortened clear channel assessment ("Type II CCA") for the transmission of the HARQ ACK. In various embodiments, the remote unit transmits the HARQ ACK without performing a clear channel assessment ("CCA").

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a transceiver of the apparatus that receives during a random access procedure ("RACH procedure"), a random access response ("RAR") message, sent by a base station operating on an unlicensed carrier and having determined via listen-before-talk that the channel is clear, the RAR message comprising an RAR grant having an uplink resource allocation for the RACH procedure;
a processor of the apparatus that determines an indication that skipping of an uplink transmission is configured for the RACH procedure, the indication explicitly communicated for the RACH procedure by the base station on the unlicensed carrier; and
wherein the processor controls the transceiver to perform one or more actions selected from skipping the uplink transmission and skipping the generation of a transport block ("TB") without logical channel ("LCH") data on the uplink resource allocation in response to determining the indication that skipping is configured for the RACH procedure and further determining that no uplink data is available.

2. The apparatus of claim 1, wherein the indication that skipping is configured for the RACH procedure comprises determining that the uplink grant was addressed to a Radio Network Temporary Identifier ("RNTI"), the RNTI selected from a Temporary Cell RNTI ("Temporary C-RNTI") and a Random Access RNTI ("RA-RNTI").

3. The apparatus of claim 2, wherein the indication that skipping is configured for the RACH procedure comprises the uplink resources corresponding to the uplink grant being allocated on the unlicensed carrier.

4. The apparatus of claim 2, wherein the indication that skipping is configured for the RACH procedure comprises data within the RAR message.

5. The apparatus of claim 2, wherein the indication that skipping is configured for the RACH procedure comprises data within downlink control information ("DCI") scheduling the RAR message on a downlink shared channel ("DL-SCH").

6. The apparatus of claim 2, wherein the indication that skipping is configured for the RACH procedure comprises a higher layer signaling parameter that configures the remote unit for skipping the uplink transmission.

7. The apparatus of claim 1, wherein the processor further:
receives a retransmission request corresponding to the RAR message; and
controls the transceiver to skip the retransmission in response to the retransmission request being scheduled by DCI addressed to a Temporary Cell RNTI of the remote unit.

8. The apparatus of claim 1, wherein the processor further:
receives a retransmission request corresponding to the RAR message; and
controls the transceiver to transmit a TB in response to the retransmission request being scheduled by DCI addressed to a Temporary Cell RNTI of the remote unit.

9. The apparatus of claim 1, wherein the indication that skipping is configured for the RACH procedure further explicitly indicates to the remote to not generate the TB without LCH data.

10. The apparatus of claim 9, wherein the indication that skipping is configured for the RACH procedure comprises a predefined combination of values within one or more fields of the RAR grant.

11. The apparatus of claim 10, wherein the predefined combination of values comprises an invalid value in a resource allocation of the RAR grant.

12. The apparatus of claim 11, wherein the resource allocation of the RAR grant is selected from a Msg3 physical uplink shared channel ("PUSCH") frequency allocation and a PUSCH time resource allocation.

13. The apparatus of claim 9, wherein the indication that explicitly indicates to the remote unit to skip the uplink transmission and/or to not generate the TB without LCH data is received in a Reserved ("R") bit of the RAR message.

14. The apparatus of claim 13, wherein in response to the R bit being not set, the processor:
controls the transceiver to skip the uplink transmission on the uplink resource of the grant; and
processes one or more other commands in fields of the RAR message other than a grant field.

15. The apparatus of claim 1, wherein the processor further controls the transceiver to transmit an aperiodic sounding reference signal ("SRS") to indicate acknowledgment of the RAR during the RACH procedure in which skipping is configured and no uplink data is available.

16. The apparatus of claim 15, wherein a request to transmit the SRS is conveyed in an uplink grant field of the RAR message.

17. The apparatus of claim 15, wherein a resource allocation for the SRS transmission is configured using a higher layer signaling parameter.

18. The apparatus of claim 15, wherein the SRS is transmitted on the uplink resource allocation for the uplink transmission.

19. The apparatus of claim 15, wherein a resource allocation for the SRS transmission comprises a parameter in the RAR message separate from the uplink resource allocation in the RAR grant.

20. The apparatus of claim 15, wherein the processor further controls the transceiver to perform a shortened clear channel assessment ("Type II CCA") for the SRS transmission.

21. The apparatus of claim 1, wherein the processor further controls the transceiver to transmit a hybrid automatic repeat request ("HARQ") acknowledgment ("ACK") message to indicate acknowledgment of the RAR during the RACH procedure in which skipping is configured and no uplink data is available.

22. The apparatus of claim 21, wherein the transceiver transmits the HARQ ACK on a Physical Uplink Control Channel ("PUCCH") resource.

23. The apparatus of claim 21, wherein the processor further controls the transceiver to perform a shortened clear channel assessment ("Type II CCA") for the transmission of the HARQ ACK.

24. A method for a remote unit comprising:
receiving a random access response ("RAR") message from a base station operating on an unlicensed carrier and having determined via listen-before-talk that the channel is clear, the RAR message comprising an RAR grant having an uplink resource allocation during a random access procedure ("RACH procedure");
receiving an indication that skipping of an uplink transmission is configured for the RACH procedure, the indication explicitly communicated for the RACH procedure by the base station on the unlicensed carrier; and
skipping one or more actions selected from: performing the uplink transmission; and generating a transport block ("TB") without logical channel ("LCH") data on the uplink resource allocation, in response to receiving the indication that skipping is configured for the RACH procedure and in further response to determining that no uplink data is available.

* * * * *